(12) United States Patent
Lory

(10) Patent No.: US 7,021,596 B2
(45) Date of Patent: Apr. 4, 2006

(54) AIRCRAFT SEAT FLOOR TRACK QUICK RELEASE FITTING

(75) Inventor: John C. Lory, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 175 days.

(21) Appl. No.: 10/779,101

(22) Filed: Feb. 11, 2004

(65) Prior Publication Data

US 2005/0173608 A1    Aug. 11, 2005

(51) Int. Cl.
*F16M 13/00* (2006.01)

(52) U.S. Cl. .................................. 248/429; 248/423
(58) Field of Classification Search ............ 248/424, 248/429, 419, 420, 423, 418; 297/344.21, 297/344.24
See application file for complete search history.

(56) References Cited

U.S. PATENT DOCUMENTS

| | | | | |
|---|---|---|---|---|
| 4,047,689 A | * | 9/1977 | Grendahl | 410/105 |
| 4,062,298 A | * | 12/1977 | Weik | 410/105 |
| 4,089,500 A | * | 5/1978 | Gustafsson | 248/429 |
| 4,449,875 A | * | 5/1984 | Brunelle | 410/80 |
| 4,496,271 A | * | 1/1985 | Spinosa et al. | 410/105 |
| 4,911,381 A | * | 3/1990 | Cannon et al. | 244/122 R |
| 4,913,489 A | * | 4/1990 | Martin | 297/232 |
| 5,178,346 A | * | 1/1993 | Beroth | 244/122 R |
| 5,302,065 A | * | 4/1994 | Vogg et al. | 411/85 |
| 5,816,110 A | * | 10/1998 | Schuler et al. | 74/527 |
| 5,823,727 A | * | 10/1998 | Lee | 411/85 |
| 5,871,318 A | * | 2/1999 | Dixon et al. | 410/105 |
| 5,975,822 A | | 11/1999 | Ruff | 411/553 |
| 6,149,118 A | | 11/2000 | Ruff | 248/415 |
| 6,637,712 B1 | * | 10/2003 | Lagerweij | 248/429 |
| 6,736,458 B1 | * | 5/2004 | Chabanne et al. | 297/344.1 |
| 6,902,365 B1 | * | 6/2005 | Dowty | 410/105 |

* cited by examiner

Primary Examiner—A. Joseph Wujclak, III
(74) Attorney, Agent, or Firm—Jerry Holden; John Titus

(57) ABSTRACT

A quick release fitting for securing seating or other equipment to a section of aircraft floor track channel comprises a lower jaw member, an upper jaw member and multiple T-shaped cam members nested between locating dowels extending from the lower surface of the lower jaw member. The locating dowels are disposed in a plurality of adjacent cutouts in the floor track channel to locate the lower jaw member, and with it the rest of the quick release fitting. As the cam members are rotated to engage the aircraft floor track channel, the camming action draws the upper and lower jaw members together to squeeze a flange attached to the piece of equipment between the beveled facing surfaces of the upper and lower jaw members. Use of multiple T-shaped cams engaging the floor track channel adjacent a plurality of adjacent cutouts allows for better distribution of load along the floor track channel and the use of beveled jaws to support the equipment allows for angular misalignment of adjacent floor track channels.

6 Claims, 5 Drawing Sheets

10

AIRCRAFT SEAT FLOOR TRACK QUICK RELEASE FITTING

BACKGROUND OF THE INVENTION

This invention relates to aircraft interior equipment and more particularly, to fittings for releasably securing seating and other equipment in aircraft.

In the manufacture and fitting out of aircraft, purchasers of the same basic aircraft model may require different seating or equipment arrangements. Accordingly, there is frequently a need for fittings that will allow seating, bulkheads, or other equipment to be realeasably mounted in any of a number of selectable locations. Moreover, because attachment points must periodically be inspected for damage or corrosion, the releasable mounts should be capable of being quickly released and reattached so as to minimize the time necessary to conduct the inspections.

Standard aircraft floor track channel comprises a channel having an inverted T-shaped cross-section typically running the length of the passenger cabin of the aircraft. The upper surface of the floor track channel has circular cutouts evenly spaced along the length of the channel, which allow a mounting pin to be inserted into the channel to engage the underside of the channel interior surface, thereby securing the mounting pin to the floor track channel. In order to avoid undue stress on the floor track channel at any one point, it is often preferable to provide multiple mounting points for a single seat or piece of equipment so that the load placed on the floor track channel is distributed.

Multiple methods and apparatus have been proposed for providing fittings for securing equipment and seating to aircraft floor track channel. For example, U.S. Pat. No. 5,975,822 discloses a quick release fitting comprising an outer housing that is keyed to the floor track channel. The outer housing has a bore that houses a rotatable inverted T-shaped key that rotates through a 90° angle to engage the underside of the floor channel interior. The T-shaped key has a lever and spring-loaded pin lock that allows the user to manly rotate the key and lock it in position. The fitting disclosed in the '822 patent, however, engages only a single lip of the floor track channel and the arm is too long to permit multiple fittings to be placed in adjacent cutouts along the floor track. Accordingly, the quick release fitting of the '822 patent does not provide optimal distributed loading along the floor track channel. Moreover, the quick release fitting disclosed in the '822 patent bears directly on the upper surface of the floor track channel with no means for accommodating misalignment between adjacent channels. Accordingly, in many cases equipment such as a chair that must be attached to two parallel floor tracks cannot be attached using the quick release fitting of the '822 patent without some other means of accommodating angular misalignment.

Accordingly, what is needed is a quick release fitting for securing equipment to a floor track channel that engages the floor track simultaneously over a wider area of the floor track and also accommodates angular misalignment between adjacent floor tracks.

SUMMARY OF THE INVENTION

The present invention comprises a quick release fitting for securing seating or other equipment to a section of aircraft floor track channel comprising a pair of beveled jaw members that are drawn together to squeeze a flange attached to the piece of equipment as a T-shaped cam is rotated to engage the aircraft floor track channel. In the illustrative embodiment, multiple T-shaped cam members are nested between locating dowels that are disposed in a plurality of adjacent cutouts in the floor track channel. According to the illustrative embodiment, the multiple cams are driven simultaneously by a single bar linkage that is attached to multiple bell cranks each of which is attached to one of the T-shaped cams. As the bar linkage is moved, the bell cranks rotate the T-shaped cams through 90° to engage the underside of the interior of the floor track channel. Use of multiple T-shaped cams engaging the floor track channel adjacent a plurality of adjacent cutouts allows for better distribution of load along the floor track channel and the use of beveled jaws to support the equipment allows for angular misalignment of adjacent floor track channels.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
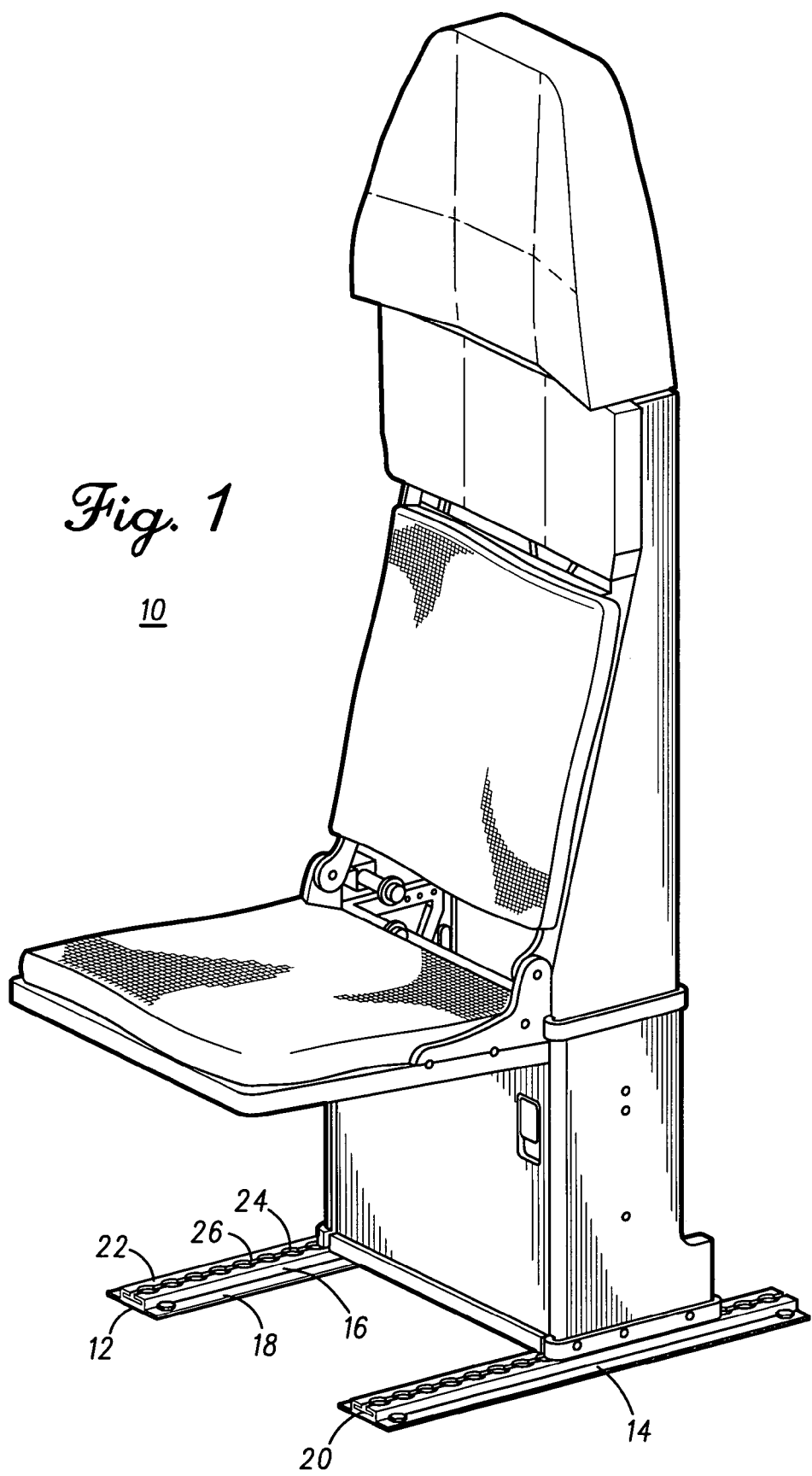
FIG. 1 is a perspective view of an aircraft flight attendant or crew seat and floor track assembly incorporating features of the present invention.

The drawing figures are intended to illustrate the general manner of construction and are not necessarily to scale. In the detailed description and in the figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

As noted above, in the manufacture and fitting out of aircraft there is frequently the need for fittings that will allow seating or other equipment to be releasably mounted in any number of locations within the passenger cabin of the aircraft. This is typically accomplished by attaching the equipment, such as an aircraft seat 10 to one or more floor track channels 12 and 14 that run the length of the passenger cabin of the aircraft. Floor track channel 12 comprises a channel member 16 and a mounting flange 18 that is mounted to the aircraft floor (not shown). Channel member 16 has an interior 20 that is substantially T-shaped in cross-section. A plurality of circular cutouts 24 are spaced at regular intervals along upper surface 22 of channel member 16 leaving a plurality of regularly spaced lips 26 that extend inward along upper surface 22 of channel member 16. (Floor track 14 is substantially identical in construction and therefore will not be discussed herein in detail.)

Figure 2:
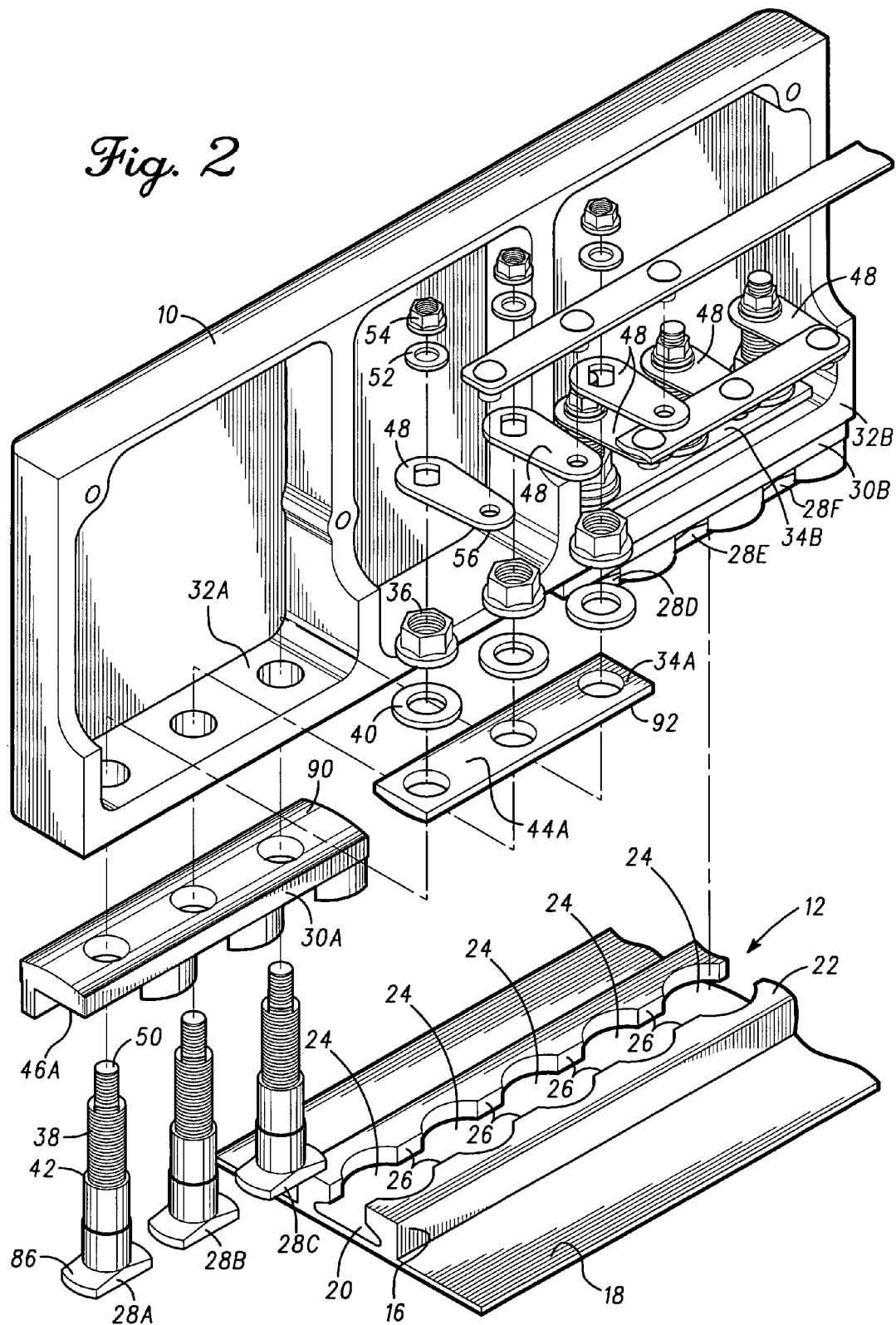
FIG. 2 is a partially exploded perspective view of a quick release fitting and floor track channel incorporating features of the present invention.

With reference to FIG. 2, A quick release fitting for attaching a piece of equipment such as aircraft seat 10 to floor track channel 12 comprises a plurality of cam members 28A–F each of which has a substantially inverted T-shaped profile. The expression T-shaped is used herein is intended to encompass, in addition to strictly T-shaped formations, any formation which has a head or end that is wider than a stem or narrower portion and thus, for example is intended to cover dove tail shapes and the like. Each of cam members 28A–F passes through a corresponding of one of lower jaw members 30A, 30B through a flange 32A–32B of the equipment (such as aircraft seat 10 to be attached to the aircraft) and through an upper jaw 34A–B.

Cam member 28A is secured to lower jaw 30A, flange 32A and upper jaw 34A by means of a lock nut 36 that is threaded onto stem 38 of cam member 28A. A thrust washer 40 bears against a shoulder 42 to maintain a fixed distance between the upper surface 44A of upper jaw 34A and lower surface 46A of lower jaw 30A. A bell crank 48 is keyed to the tip 50 of cam member 28A and secured thereto by means of a conventional flat washer 52 and nut 54. (The assembly details of the remaining cam members 28B–F are substantially identical and therefore for the sake of brevity are not discussed herein in detail.)

Figure 3:
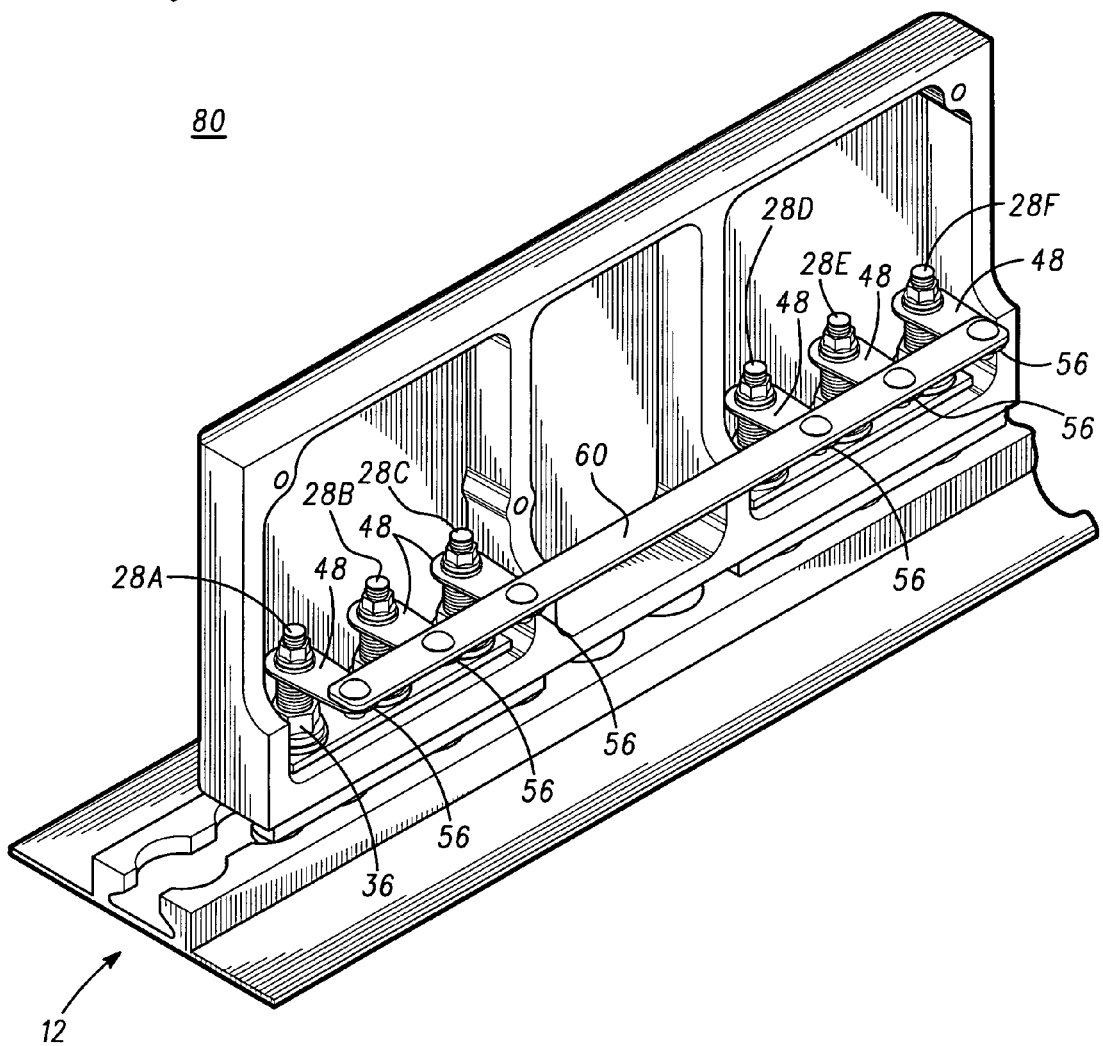
FIG. 3 is a perspective view of the quick release fitting of FIG. 2 assembled to a floor track channel.

With reference to FIG. 3, the free ends 56 of each of bell cranks 48 are attached to a bar linkage by a rivet or other rotatable attachment, such that as bar linkage 60 is moved, each of bell cranks 48 and therefore cam members 28A–F are moved in unison.

Figure 4:
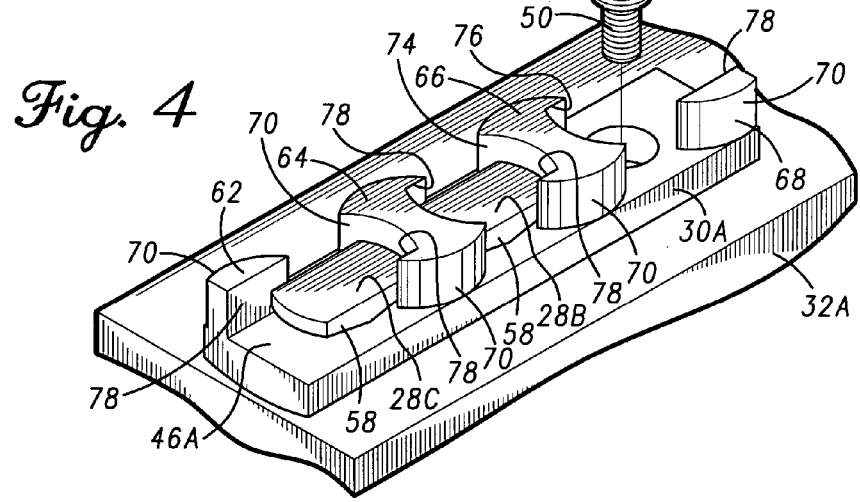
FIG. 4 is a bottom view of a portion of the quick release fitting of FIG. 3.

With reference to FIG. 4, a plurality of locating dowels 62, 64, 66 and 68 extend from lower surface 46A of lower jaw 30A. Locating dowels 62–68 each have an outer cylindrical surface 70 that is sized to match (both in size and spacing) the circular cutouts 24 of floor track channel 12. Locating dowels 64 and 66 also include concave cutouts 70, 72, 74 and 76 to provide for clearance of the head 58 of each of cam members 28A–C. Locating dowels 62–68 also each include a stop surface 78 to limit the rotational movement of cam members 28A–C.

With reference to FIGS. 2–5, in operation, to attach aircraft seat 10 to floor track 12, the quick release fitting assembly 80 comprising cam members 28A–F, lower jaws 30A–B, flanges 32A–B, upper jaws 34A–B, bell cranks 48 and bar linkage 60 is placed such that locating dowels 62–68 pass through corresponding apertures 24 in floor track channel 12. The flats 82 and 84 formed on head 58 of cam member 28A are sized such that head 58 passes between lips 26 of floor channel 12. (The corresponding flats on cam members 28B–F are similarly sized)

Figure 5:
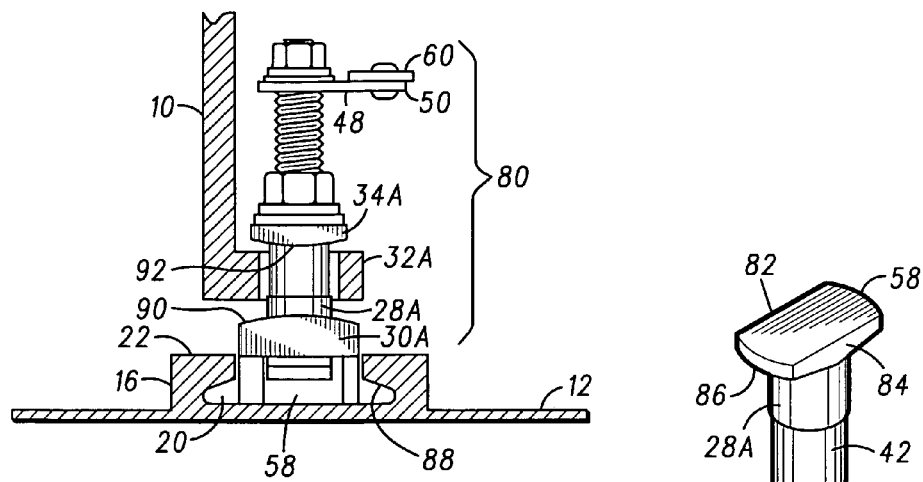
FIG. 5 is a cross-sectional view of the quick release fitting and floor track channel of FIG. 3 in the unlocked position.
Figure 6:
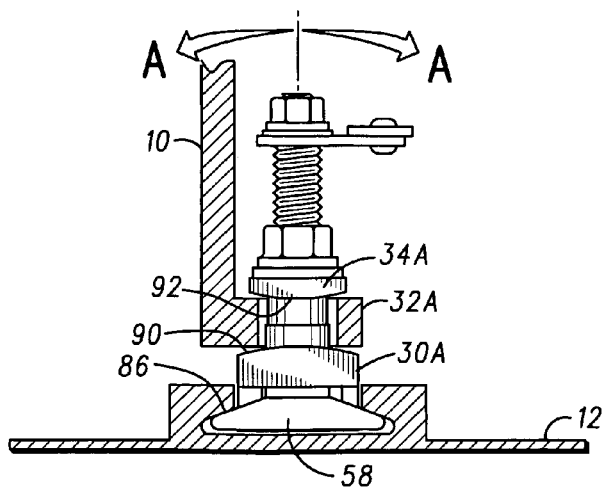
FIG. 6 is a cross-sectional view of the quick release fitting and floor track channel of FIG. 3 in the locked position.
Figure 7:
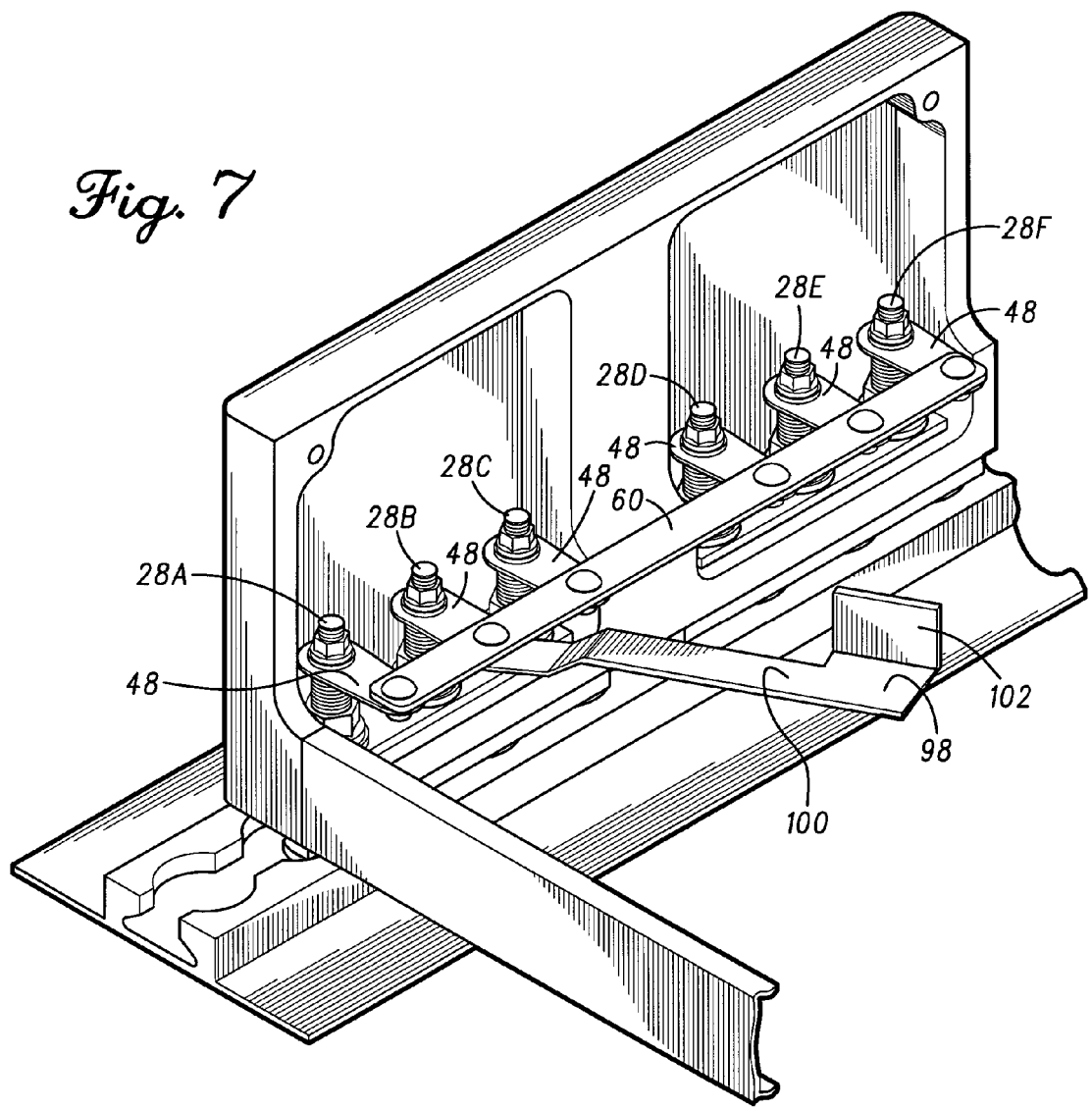
FIG. 7 is a perspective view of an alternative embodiment of a quick release fitting and floor track channel incorporating features of the present invention.

With reference now to FIG. 6, once in position, bar linkage 60 is moved such that bell cranks 48, and with them cam members 28A–F, are rotated through a 90° arc thus bringing the upper surfaces 86 of cam members 28A–F into contact with the lower surface 88 of the interior 20 of channel member 16. As cam members 28A–F are rotated through 90°, the camming action of upper surfaces 86 bearing against lower surface 88 causes cam members 28A–F to be drawn downward into floor track channel 12. This, in turn draws lower jaws 30A–B and upper jaws 34A–B together, squeezing flanges 32A–B therebetween to secure aircraft seat 10 to floor track channel 12. Upper surface 90 of lower jaw 30A and lower surface 92 of upper jaw 34A are beveled (i.e., the surfaces are convex in cross-section as shown in FIGS. 5–6). Accordingly, flange 32A is able to rock in the direction indicated by arrow A—A in FIG. 6, notwithstanding that flange 32A is securely attached to seat track 12. Thus, if seat track 12 and seat track 14 are angularly misaligned, a seat or other equipment can still be attached to both seat tracks without difficulty.

In an alternative embodiment incorporating features of the present invention, one of bell cranks 48 is replaced with an elongated bell crank 98 having an arm 100 that extends radially past bar linkage 60 to provide additional torque for moving a large number of cam members 38A–F from the open to the locked position. Arm 100 may be equipped with a flange 102 to allow arm 100 to be manipulated by hand and also to provide a convenient attaching point for a conventional latch to hold arm 100 in place (such as a threaded fastener clip, pin and clevis or other conventional means.)

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to extent required by the appended claims and the rules and principals of applicable law.

What is claimed is:

1. A quick-release fitting for securing a mounting flange of a piece of equipment to a section of channel, the channel having an upper surface, an inverted T-shaped interior cross-section opening through the upper surface, and a plurality of circular cutouts extending from the upper surface of the channel into the interior of the channel at regularly-spaced intervals along a longitudinal axis of the channel, said quick-release fitting comprising:

a lower jaw member having a beveled upper surface and a lower surface, the lower surface of said lower jaw being adapted to bear against the upper surface of the channel, the lower surface of said lower jaw further including a locating dowel having a partially circular cross section projecting downward therefrom adapted to engage one of said plurality of circular cutouts, the beveled upper surface of said lower jaw adapted to bear against the lower surface of the mounting flange;

an upper jaw member disposed above said lower jaw member, said upper jaw member having an upper surface and a beveled lower surface adapted to bear against an upper surface of the mounting flange;

a cam member located adjacent to said locating dowel; said cam member having a generally inverted T-shaped profile, comprising a stem of generally cylindrical shape and a pair of radially extending arms having upper surfaces that slope outwardly and downwardly, the upper surfaces of the arms being adapted to provide a camming action against a lower surface of the interior cross-section of the channel as said cam member is rotated from a first position in which the arms of the cam member extend in a direction substantially parallel to the longitudinal axis of the channel, to a second position in which the arms of the cam member extend in a direction substantially perpendicular to the longitudinal axis of the channel to engage the upper surface of the interior cross-section of the channel, the stem of said cam member passing through corresponding openings in said upper jaw member and said lower jaw member, said cam member further including a collar having a bearing surface that bears against the upper surface of said upper jaw member; and a bell crank member extending radially from the stem of the cam member for applying a torque to the stem of the cam member, whereby as said cam member is rotated by application of a force to said bell crank member, the upper surfaces of the radially extending arms engage the lower surface of the interior cross-section of the channel thereby drawing the lower jaw member against the channel locking the locating dowel into the circular cutout and simultaneously drawing together the upper and lower jaw members to lock the equipment mounting flange between the beveled surfaces of the upper and lower jaw members, thereby securing the equipment mounting flange to the channel while still permitting the equipment mounting flange to rock between the beveled surfaces of the upper and lower jaw members.

2. The quick-release fitting of claim 1, wherein, said locating dowel includes a relief opening concave outward toward the lateral surface of said locating dowel, the relief being adapted to provide clearance for an adjacent radially extending arm to rotate in an arc from said first position to said second position.

3. The quick-release fitting of claim 2, wherein: said lower jaw member comprises an elongate member, said lower jaw member further including at least one additional locating dowel projecting downward from the lower surface of said lower jaw member to form a plurality of locating dowels, said plurality of locating dowels being located at regularly-spaced intervals to correspond with plural of said circular cutouts.

4. The quick release fitting of claim 3, further comprising: at least one additional cam member and one additional bell crank member, which together with said first cam and bell crank members form a plurality of cam members adapted to engage the lower surface of interior cross-section and a plurality of bell crank members for exerting torque on said plurality of cam members; and a bar linkage attached to a free end of each of said plurality of bell crank members for moving said bell crank members in unison.

5. The quick release fitting of claim 4, further comprising: a latch for retaining said bar linkage in a position for holding said plurality of cam members in said second position.

6. An aircraft seat assembly having a mounting flange and a quick-release fitting for securing the aircraft seat to a section of channel, the channel being mounted to an aircraft floor and having an upper surface, an inverted T-shaped interior cross-section opening through the upper surface, and a plurality of circular cutouts extending from the upper surface of the channel into the interior of the channel at regularly-spaced intervals along a longitudinal axis of the channel, said quick-release fitting comprising:

a lower jaw member having a beveled upper surface and a lower surface, the lower surface of said lower jaw being adapted to bear against the upper surface of the channel, the lower surface of said lower jaw further including a plurality of locating dowels projecting downward therefrom at regularly-spaced intervals to correspond with selected of the plurality of circular cutouts, each of said plurality of locating dowels having a partially circular cross section adapted to engage one of said plurality of circular cutouts, the beveled upper surface of said lower jaw member being adapted to bear against a lower surface of the mounting flange;

an upper jaw member disposed above said lower jaw member, said upper jaw member having an upper surface and a beveled lower surface adapted to bear against an upper surface of the mounting flange;

a plurality of cam members each of said cam members having a generally inverted T-shaped profile comprising a stem substantially cylindrical in shape and a pair of radially extending arms having upper surfaces that slope outwardly and downwardly, the upper surfaces of the arms being adapted to provide a camming action against a lower surface of the interior cross-section of the channel as each of said cam members is rotated from a first position in which the arms of the cam member extend substantially parallel to the longitudinal axis of the channel, to a second position in which the arms of the cam member extend substantially perpendicular to the longitudinal axis of the channel, the stem of each of said cam members passing through corresponding openings in said upper jaw member and said lower jaw member, each of said cam members further including a collar having a bearing surface that bears against the upper surface of said upper jaw member;

a plurality of bell crank members, each of said plurality of bell crank members extending radially from the stem of one of the plurality of cam members outward to a free end, each of said plurality of bell crank members being capable of applying a torque to the stem of a cam member, and a bar linkage attached to the free end of each of said plurality of bell crank members;

whereby as said bar linkage is moved, said plurality of cam members are rotated in unison by application of a force to said plurality of bell crank members, thereby causing the upper surfaces of the radially extending arms of said plurality of cam members to engage the lower surface of the interior cross-section of the channel, which draws the lower jaw member against the channel thereby locking the locating dowels into selected of said plurality of circular cutouts and simultaneously draws together the upper and lower jaw members to lock the mounting flange between the beveled surfaces of the upper and lower jaw members, thereby securing the seat assembly to the channel while still permitting the mounting flange to rock between the beveled surfaces of the upper and lower jaw members.

* * * * *